United States Patent
Kim

(10) Patent No.: US 7,129,520 B2
(45) Date of Patent: *Oct. 31, 2006

(54) LIQUID CRYSTAL DISPLAY DEVICE WITH A TEST PAD FOR TESTING PLURAL SHORTING BARS

(75) Inventor: Ik Soo Kim, Kunpo-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 86 days.

This patent is subject to a terminal disclaimer.

(21) Appl. No.: 10/957,647

(22) Filed: Oct. 5, 2004

(65) Prior Publication Data

US 2005/0056833 A1  Mar. 17, 2005

Related U.S. Application Data

(62) Division of application No. 10/028,973, filed on Dec. 28, 2001, now Pat. No. 6,861,665.

(30) Foreign Application Priority Data

Dec. 29, 2000 (KR) .............................. P2000-86012

(51) Int. Cl.
*H01L 23/58* (2006.01)
*G02F 1/1343* (2006.01)

(52) U.S. Cl. ........................ 257/48; 349/143; 349/147

(58) Field of Classification Search .................. 349/147
See application file for complete search history.

(56) References Cited

U.S. PATENT DOCUMENTS

| 5,068,748 | A |  | 11/1991 | Ukai et al. |
| 5,497,146 | A |  | 3/1996 | Hebiguchi |
| 6,005,647 | A | * | 12/1999 | Lim ............................ 349/40 |
| 6,025,891 | A | * | 2/2000 | Kim ............................ 349/40 |
| 6,128,051 | A |  | 10/2000 | Kim et al. |
| 6,246,074 | B1 |  | 6/2001 | Kim et al. |
| 6,287,899 | B1 |  | 9/2001 | Park et al. |
| 6,613,650 | B1 | * | 9/2003 | Holmberg ................... 438/438 |
| 6,861,665 | B1 | * | 3/2005 | Kim ............................ 257/48 |
| 2001/0045997 | A1 | * | 11/2001 | Kim ............................ 349/40 |

* cited by examiner

*Primary Examiner*—Stephen W. Smoot
(74) *Attorney, Agent, or Firm*—McKenna Long & Aldridge LLP

(57) ABSTRACT

An LCD device includes a plurality of data pads; an LCD panel defined by a plurality of pad regions; a first shorting bar connected to odd numbered data pads among the plurality of data pads; a second shorting bar connected to even numbered data pads among the plurality of data pads; and a test pad formed in a predetermined portion of a pad region among the plurality of pad regions to apply a signal voltage for on/off testing to the first shorting bar and the second shorting bar.

10 Claims, 6 Drawing Sheets

FIG.4
RELATED ART
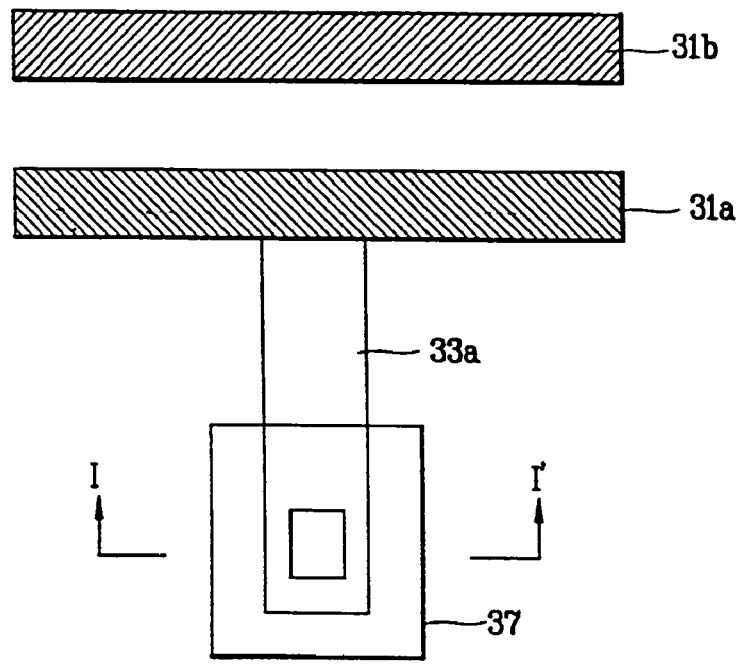
RELATED ART FIG.5A
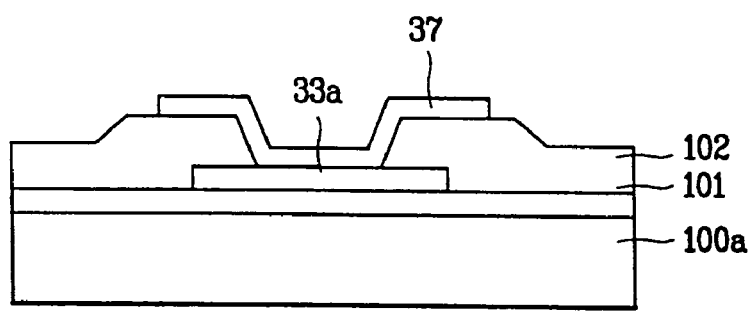
RELATED ART FIG.5B
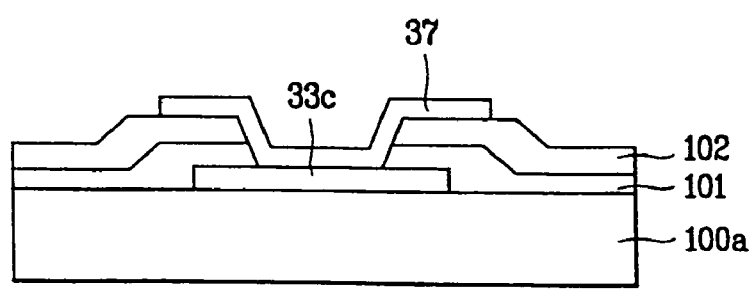

ns to the gate lines, the signal voltage applied
LIQUID CRYSTAL DISPLAY DEVICE WITH A TEST PAD FOR TESTING PLURAL SHORTING BARS This is a divisional application of Ser. No. 10/028,973, filed Dec. 28, 2001 now U.S. Pat. No. 6,861,665, which claims priority to Korean Application No. 2000-86012, filed Dec. 29, 2000, each of which are incorporated in their entirety as if fully set forth herein.

BACKGROUND OF THE INVENTION

1. Field of the Invention

The present invention relates to a display device, and more particularly, to a test pad of a liquid crystal display (LCD) device.

2. Discussion of the Related Art

CRT Braun tubes have been widely used for monitors of televisions and computers to achieve a relatively easy display of colors and a rapid operation time.

However, CRT Braun tubes tend to have high power consumption. In a typical CRT Braun tube, a certain distance is needed between an electron gun and a screen. This distance makes it difficult to construct compact CRT Brown tubes. Also, a CRT Braun tube is typically heavy, so that it is hard to carry. To solve these problems, various display devices have been studied. Among these display devices, LCD devices have been widely used.

An LCD device can be manufactured to have a relatively thin structure, so that the LCD device can be used as an ultra thin display device for a wall-tapestry television set, for example. Also, LCD devices are light in weight and tend to have low power consumption. For these reasons, LCD devices have attracted attention as substitutes for CRT Braun tubes. For example, LCD devices are now widely used for notebook computers operated by batteries.

As shown in FIG. 1, an LCD device includes a lower substrate 1 having a TFT as a switching device, an upper substrate 2 having a color filter, and a liquid crystal 3 formed between the lower substrate 1 and the upper substrate 2. Even though the LCD device does not emit light itself, picture images are displayed by an electro-optical mechanism of the liquid crystal.

As shown in FIG. 1, TFT array 4 is formed on the lower substrate 1, and a black matrix 5, a color filter film 6, a common electrode 7, and an alignment film 8 are sequentially formed on the upper substrate 2.

The lower substrate 1 and the upper substrate 2 are attached to each other by a sealant 9, which may be, for example, an epoxy resin. Then, a driving circuit 11 and a printed circuit board (PCB) 10 is connected to the lower substrate 1 through a tape carrier package (TCP) 12.

In the TFT array 4, a plurality of gate lines and data lines are formed to cross each other, and a plurality of TFTs are formed at intersections of the gate lines and the data lines.

The LCD device is divided into three parts: an LCD panel, a printed circuit board (PCB), and an external part. The LCD panel includes two substrates having liquid crystal. The PCB injected therebetween has drivers that drive the LCD panel and internal circuitry. The external part includes a backlight 13.

FIG. 2 is a module diagram showing a structure of the LCD panel and the driver.

As shown in FIG. 2, the LCD device includes an LCD panel 21, a gate driver 23 that drives a gate driving signal to the LCD panel 21, and a source driver 25 that applies signal data to the LCD panel 21.

The gate driver 23 generates scan signals sequentially to a plurality of gate lines arranged on the LCD panel 21. Then, the source driver 25 applies a signal voltage through the data lines when the gate driver 23 turns on the TFTs.

In the LCD panel, the plurality of gate lines and data lines have a matrix structure. A TFT and a pixel electrode are formed at each intersection of the gate lines and data lines. If a TFT is turned on by the scan signal that is applied from the gate driver 23 to the gate lines, the signal voltage applied from the source driver 25 to the data lines is transmitted to the pixel electrodes through the TFTs, thereby displaying a picture image.

At this time, a plurality of gate pads and data pads are extended, respectively, from the gate lines and data lines in the vicinity of the LCD panel 21 to transmit signals generated from the gate driver 23 and the source driver 25 to the LCD panel. The gate pads and data pads are connected to shorting bars to perform testing. When the testing is completed, the shorting bar is removed.

The tests can be classified into an In Processing Test (IPT) and an on/off test of a TFT.

The IPT tests for a line defect or a point defect of the gate and data lines after the lower substrate 1 is formed. The on/off test of a TFT tests for a defect in the on/off operation of a TFT after the lower substrate 1 and the upper substrate 2 are attached to each other.

The structure of a test pad according to a related art LCD device will be described in detail.

FIG. 3 is a plan view showing the structure of the test pad according to the related art LCD device.

As shown in FIG. 3, the test pad includes a first shorting bar 31a, a second shorting bar 31b, a first test pad 33a, a second test pad 33b, a third shorting bar 31c, a fourth shorting bar 31d, a third test pad 33c, and a fourth test pad 33d.

The first shorting bar 31a is connected to odd numbered data pads (Dp1, Dp3, . . . ) among a plurality of data pads (Dp1 to Dpn) and the second shorting bar 31b is connected to even numbered data pads (Dp2, Dp4 . . . ). Then, the first test pad 33a applies a signal voltage for testing to the first shorting bar 31a, and the second test pad 33b is formed in a different portion of the pad region than the first test pad 33a to apply the signal voltage for testing to the second shorting bar 31b. The third shorting bar 31c is connected to odd numbered gate pads (Gp1, Gp3, . . . ) among a plurality of gate pads (Gp1 to Gpn), and the fourth shorting bar 31d is connected to even numbered gate pads (Gp2, GP4, . . . ). Then, the third test pad 33c applies a signal voltage for testing to the third shorting bar 31c, and the fourth test pad 33d is formed on a different portion of the pad region than the third test pad 33c to apply the signal voltage for testing to the fourth shorting bar 31d.

Each gate pad is extended from gate lines (G1, G2, . . . , Gm) arranged on the LCD panel 100. Each data pad is extended from data lines (D1, D2, . . . ,Dn) arranged on the LCD panel to cross gate lines.

FIG. 4 is an enlarged plan view of the first test pad of FIG. 3. FIG. 5A is a sectional view of the first test pad taken along line I–I' of FIG. 4.

As shown in FIG. 4 and FIG. 5A, a substrate 100a is formed, and a gate insulating film 101 is formed on the substrate 100a. Then, the first test pad 33a is formed on the gate insulating film 101 and is electrically connected to the first shorting bar 31a. A passivation film 102 is formed on an entire surface of the substrate 100a including the first test pad 33a and includes a contact hole to expose a predetermined portion of the first test pad 33a. Then, a transparent conductive film 37 is electrically connected to the first test pad 33a through the contact hole of the passivation film 102.

FIG. 5B is a sectional view of the third test pad of the gate side taken along line I–I' of FIG. 3.

As shown in FIG. 5B, the substrate 100a is formed, and the third test pad 33c is formed on the substrate 100a. Then, the gate insulating film 101 is formed on the entire surface of the substrate 100a including the third test pad 33c, and the passivation film 102 is formed on the gate insulating film 101. The transparent conductive film 37 is electrically connected to the third test pad 33c by penetrating the passivation film 102 and the gate insulating film 101.

In the test pad according to the related art LCD device, the first test pad 33a is formed in a predetermined portion of the pad region to apply the signal voltage for testing to the first shorting bar 31a, and the second test pad 33b is formed in a different portion of the pad region than the first test pad 33a to apply the signal voltage for testing to the second shorting bar 31b. Also, the third test pad 33c that applies the signal voltage for testing to the third shorting bar 31c is formed in a different portion of the pad region than the fourth test pad 33d applying the signal voltage to the fourth shorting bar 31d.

The test pad according to the related art LCD device has the following problems.

In forming the test pads of the gate and data sides, a test pad that applies a signal voltage for testing to the odd numbered data pads or gate pads is formed in a different portion of the pad region than the test pad that applies a signal voltage for testing to the even numbered data pads or gate pads when on/off testing of the TFT is performed. As a result, a resistance value of the shorting bar is high.

With a high resolution of the LCD device, an area of the test pad becomes smaller. In the test pad according to the related art LCD device, because the test pads are formed in the different portions, the resistance of the shorting bar is increased. Therefore, a width of the shorting bar has to be increased to decrease the resistance.

SUMMARY OF THE INVENTION

Accordingly, the present invention is directed to an LCD device that substantially obviates one or more problems due to limitations and disadvantages of the related art.

An object of the present invention is to provide an LCD device in which a test pad that applies an electrical signal to odd numbered data pads is formed in the same portion of a pad region as a test pad that applies an electrical signal to even numbered data pads, thereby minimizing a resistance of a shorting bar.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the invention, as embodied and broadly described, an LCD device includes a plurality of data pads; an LCD panel defined by a plurality of pad regions; a first shorting bar connected to odd numbered data pads among the plurality of data pads; a second shorting bar connected to even numbered data pads among the plurality of data pads; and a test pad formed in a predetermined portion of a pad region among the plurality of pad regions to apply a signal voltage for on/off testing to the first shorting bar and the second shorting bar.

In another aspect, the LCD device includes a plurality of data pads; an LCD panel defined by a plurality of pad regions; a first shorting bar connected to data pads that drive a first color; a second shorting bar connected to data pads that drive a second color; a third shorting bar connected to data pads that drive a third color; and a test pad formed in a predetermined portion of the pad region to apply a signal voltage for on/off testing to the first shorting bar and the second shorting bar.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 4 is a partially enlarged plan view of a test pad of FIG. 3.

FIG. 5A is a first sectional view of a test pad taken along line I–I' of FIG. 3.

FIG. 5B is a second sectional view of a test pad taken along line I–I' of FIG. 3.

DETAILED DESCRIPTION OF THE INVENTION

Reference will now be made in detail to the preferred embodiments of the present invention, examples of which are illustrated in the accompanying drawings.

Figure 1:
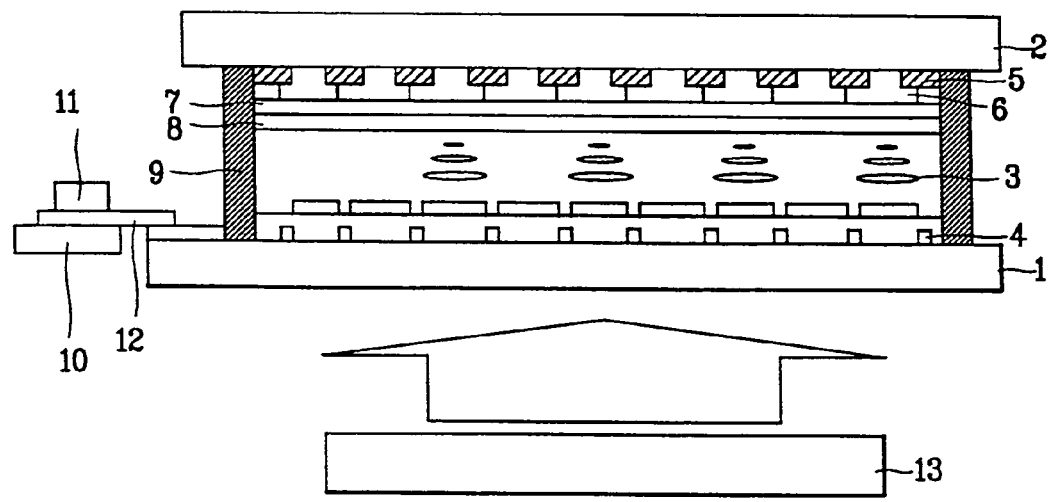
FIG. 1 is a sectional view of a related art LCD device.
Figure 2:
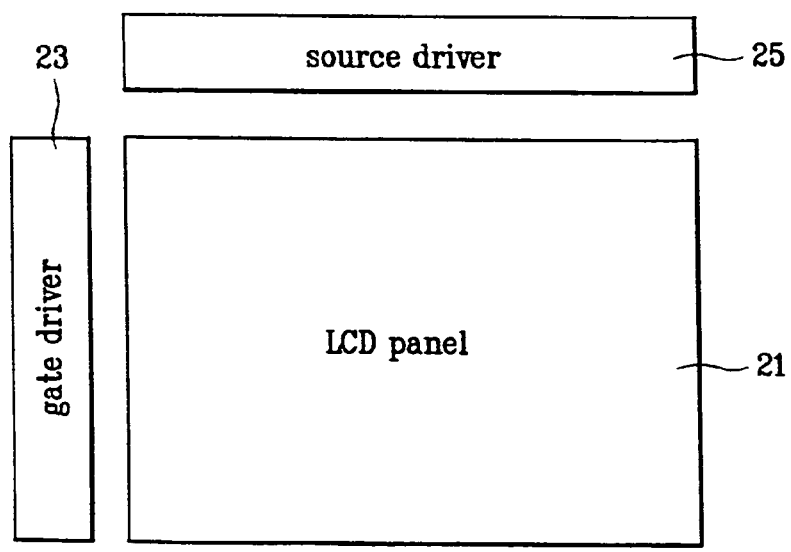
FIG. 2 is a module diagram of a related art LCD device.
Figure 3:
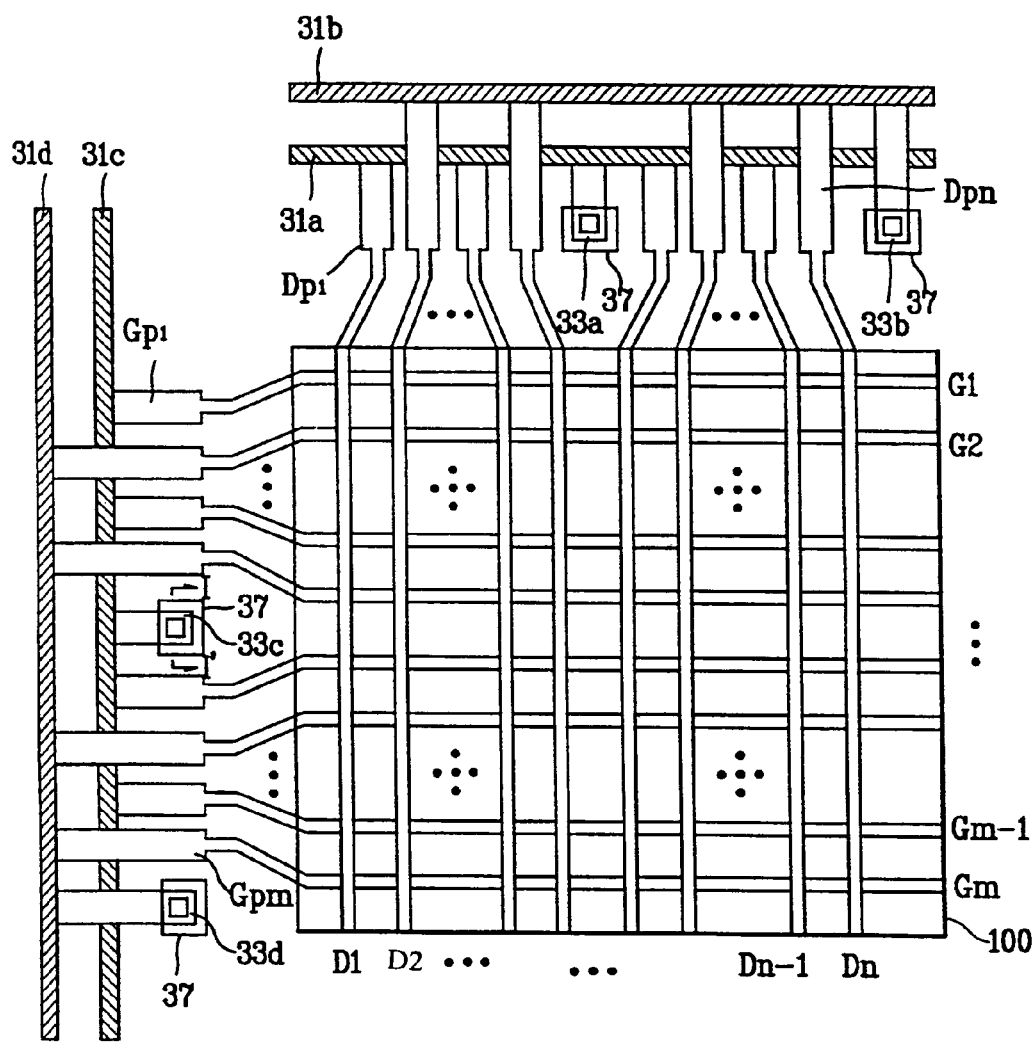
FIG. 3 is a plan view showing a structure of a test pad according to a related art LCD device.
Figure 6:
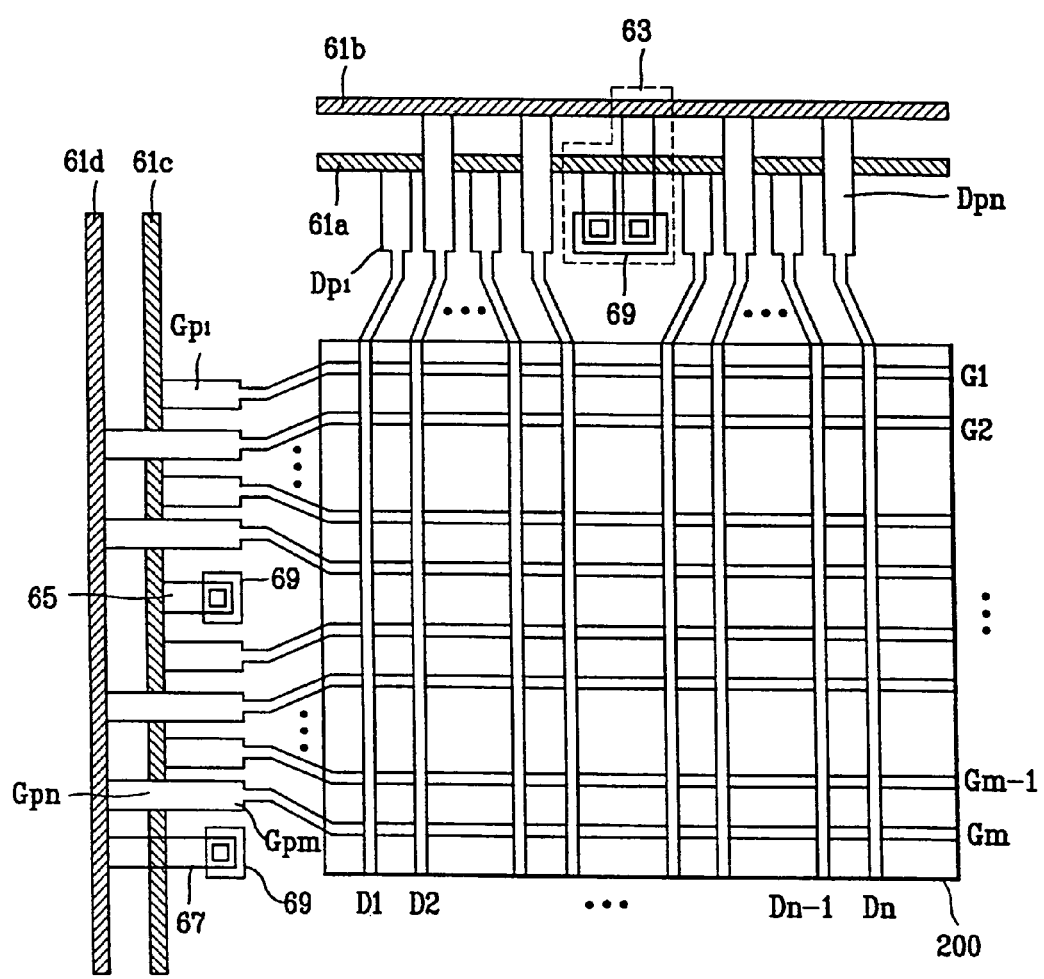
FIG. 6 is a plan view showing a test pad according to the first embodiment of the present invention.

FIG. 6 is a plan view of a test pad of an LCD device according to the first embodiment of the present invention.

As shown in FIG. 6, a first shorting bar 61a is connected to odd numbered data pads (Dp1, Dp3, . . . ) among a plurality of data pads (Dp1 to Dpn), and a second shorting bar 61b is connected to even numbered data pads (Dp2, Dp4, . . . ). Then, a first test pad 63 is formed in a predetermined portion of a pad region and applies a signal voltage for on/off testing of a TFT to the first and second shorting bars 61a and 61b.

A test pad of the gate side has the same structure as the related art. That is, a third shorting bar 61c is connected to odd numbered gate pads (Gp1, Gp3, . . . ) among a plurality of gate pads (Gp1 to Gpn), and a fourth shorting bar 61d is connected with even numbered gate pads (Gp2, Gp4, . . . ).

Then, a second test pad 65 is formed in a different portion of a pad region than a third test pad 67 and applies a signal voltage for on/off testing to the third shorting bar 61c. At this time, the third test pad 67 applies a signal voltage to the fourth shorting bar 61d.

Unlike the related art test pad of the data side, the test pads of the data side according to the present invention are formed in a predetermined portion of the pad region. Meanwhile, the test pads of the gate side are formed in different portions of the pad region, as in the related art test pads of the gate side. This is because the odd numbered gate lines should be operated separately from the even numbered gate lines during on/off testing of the TFT.

In an IPT test after forming a lower substrate, it is not required that the odd numbered gate lines be operated separately from the even numbered gate lines.

However, in the on/off testing of the TFT conducted after attaching the lower and upper substrates to each other, it is necessary to operate the odd numbered gate lines separately from the even numbered gate lines. That is, the second test pad 65 and the third test pad 67 have to be formed in different portions of the pad region to apply the signal voltage to the third shorting bar 61c and the fourth shorting bar 61d, respectively.

Figure 7A:
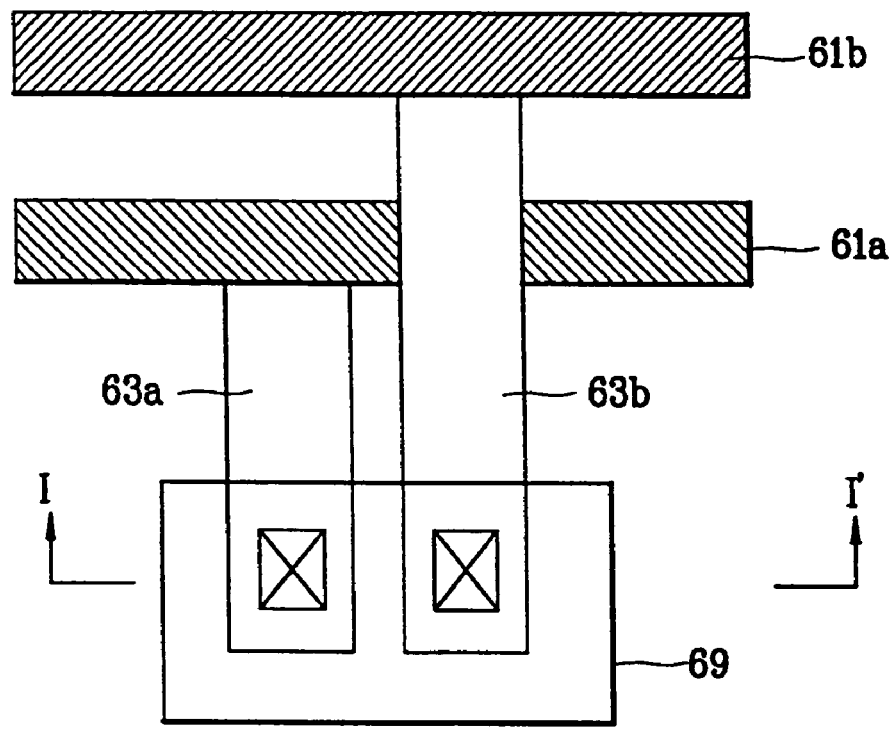
FIG. 7A is a partially enlarged view of a test pad of FIG. 6.
Figure 7B:
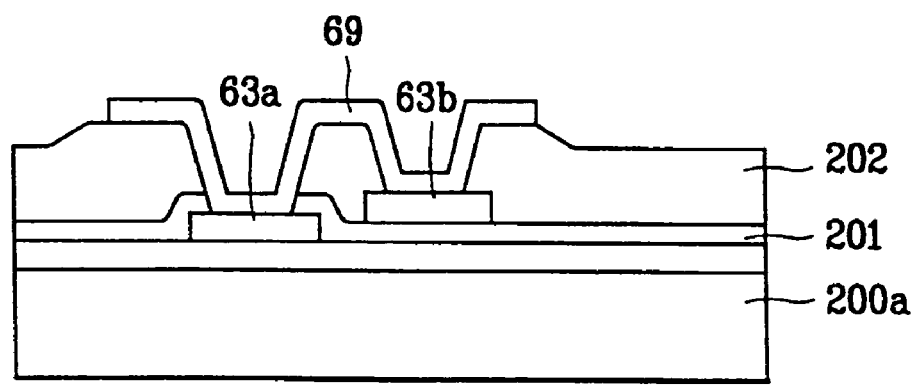
FIG. 7B is a sectional view of a test pad taken along line I–I' of FIG. 7A.

FIG. 7A is a partially enlarged view of the test pad of FIG. 6. FIG. 7B is a sectional view of the test pad taken along line I–I' of FIG. 7A.

As shown in FIG. 7A and FIG. 7B, the first test pad 63 includes a substrate 200a, a first conductive pattern 63a, a gate insulating film 201, a second conductive pattern 63b, a passivation film 202, and a transparent conductive film 69.

The first conductive pattern 63a is formed on the substrate 200a and is connected to the first shorting bar 61a, and the gate insulating film 201 is formed on an entire surface of the substrate 200 including the first conductive pattern 63a. Then, the second conductive pattern 63b is connected to the second shorting bar 61b and is formed adjacent to the first conductive pattern 63a on the gate insulating film 201. The passivation film 202 is formed on the entire surface of the substrate including the second conductive pattern 63b and includes a contact hole to expose the first conductive pattern 63a and the second conductive pattern 63b. Subsequently, the transparent conductive film 69 electrically connects the first conductive pattern 63a to the second conductive pattern 63b through the contact hole.

Although not shown, the transparent conductive film 69 is connected with Tape Carrier Package (TCP).

The first shorting bar 61a and the first conductive pattern 63a are formed of the same material as the gate lines, and the second shorting bar 61b and the second conductive pattern 63b are formed of the same material as the data lines. Accordingly, the first shorting bar 61a and the second shorting bar 61b are disposed with the gate insulating film 201 interposed therebetween. Also, the first conductive pattern 63a and the second conductive pattern 63b are disposed with the gate insulating film 201 interposed therebetween.

As shown, in the first test pad 63, the first conductive pattern 63a is electrically connected to the second conductive pattern 63b by the transparent conductive film 69, so that an equal signal voltage for testing is applied to the first shorting bar 61a and the second shorting bar 61b.

During on/off testing, the first shorting bar 61a is connected to the second shorting bar 61b by the transparent conductive film 69, so that a resistance value of the shorting bar can be reduced.

With a high resolution of the TFT LCD device, an area of the test pad for on/off testing becomes smaller. In the test pad according to the present invention, the first shorting bar 61a is electrically connected to the second shorting bar 61b, so that the resistance value of the shorting bar can be reduced. Therefore, it is not required that the shorting bar be widened.

Figure 8A:
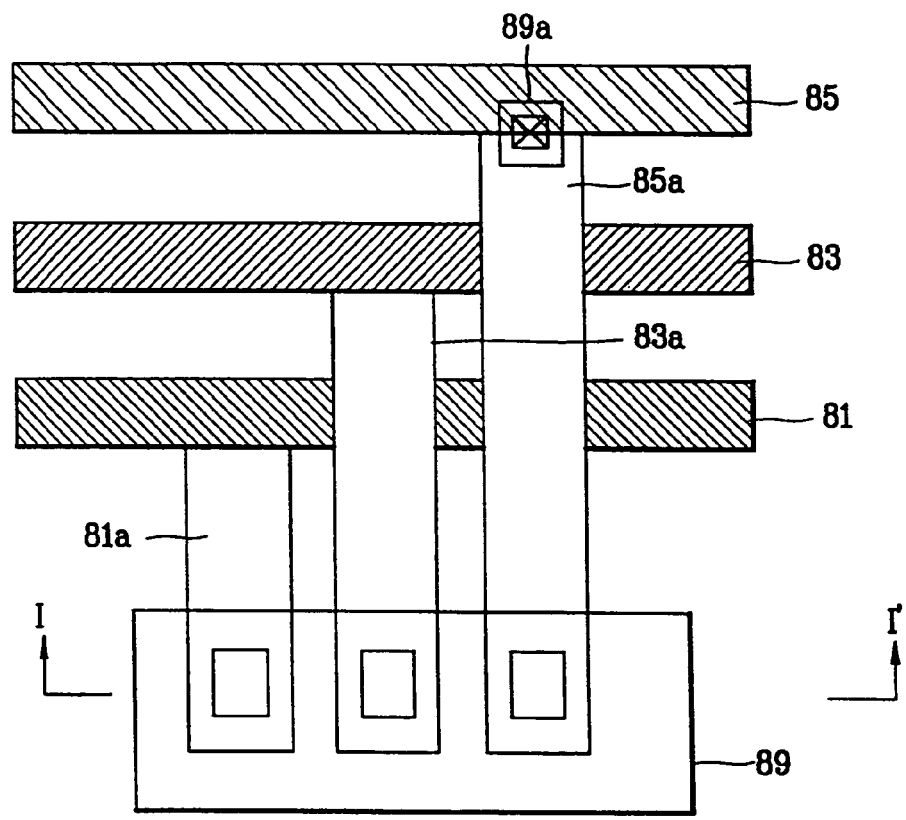
FIG. 8A is a plan view showing a structure of a test pad according to the second embodiment of the present invention.

FIG. 8A is a plan view showing a test pad of the data side according to the second embodiment of the present invention.

In the test pad according to the second embodiment of the present invention, the test pad of the data side is classified into red (R), green (G), and blue (B) pixels. A first shorting bar 81 is connected to data pads for driving the R pixels. A second shorting bar 83 is connected to data pads for driving the G pixels. A third shorting bar 85 is connected to data pads for driving the B pixels.

The first shorting bar 81 is connected to one side of a first conductive pattern 81a. The second shorting bar 83 is connected to one side of a second conductive pattern 83a. The third shorting bar 85 is connected to one side of a third conductive pattern 85a.

The other sides of the first conductive pattern 81a, the second conductive pattern 83a and the third conductive pattern 85a are electrically connected to one another by a first transparent conductive film 89 after a passivation process step.

The first shorting bar 81 and the third shorting bar 85 are formed of the same material as the gate lines, and the second shorting bar 83 is formed of the same material as the data lines.

The first conductive pattern 81a is formed of the same material as the first shorting bar 81, and the second conductive pattern 83a and the third conductive pattern 85a are formed of the same material as the second shorting bar 83.

Accordingly, the first conductive pattern 81a is connected to the first shorting bar 81 and is formed on the same layer of a substrate 300a as the gate lines and the first shorting bar 81. Then, the second conductive pattern 83a is connected with the second shorting bar 83 and is formed on the same layer of a gate insulating film 301 as the data lines and the second shorting bar 83. The third shorting bar 85 and the third conductive pattern 85a are disposed with the gate insulating film 301 interposed therebetween. That is, the third shorting bar 85 is connected to the third conductive pattern 85a by a second transparent conductive film 89a so that the third shorting bar 85 is not connected to the first shorting bar 81 electrically.

The first shorting bar 81, second shorting bar 83 and third shorting bar 85 have to be electrically disconnected from one another when tests other than on/off tests are performed. To this end, the second transparent conductive film 89a is used to connect the third conductive pattern 85a with the third shorting bar 85.

If the third conductive pattern 85a is formed on the same layer as the second shorting bar 83 and is electrically connected to the third shorting bar 85 by crossing the second shorting bar 83, the second shorting bar 83 can be directly connected to the third conductive pattern 85a. In this case, tests other than on/off tests cannot be performed.

Figure 8B:
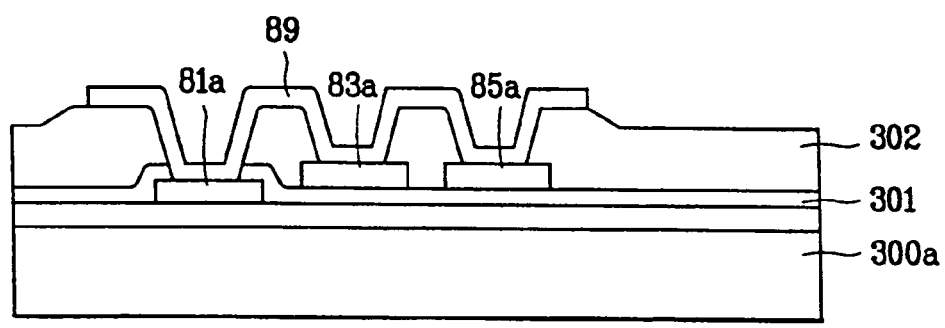
FIG. 8B is a sectional view of a test pad taken along line I–I' of FIG. 8A.

FIG. 8B is a sectional view of the test pad taken along line I–I' of FIG. 8A.

The first conductive pattern 81a is formed on the substrate 300a, and then the second conductive pattern 83a is formed on an entire surface of the substrate 300a including the first conductive pattern 81a. Subsequently, the third conductive pattern 85a is formed adjacent to the second conductive pattern 83a.

A passivation film 302 is formed on the entire surface of the substrate including the third conductive pattern 85a. The passivation film 302 includes contact holes exposing predetermined portions of the first conductive pattern 81a, second conductive pattern 83a and third conductive pattern 85a. The first conductive pattern 81a, second conductive pattern 83a and third conductive pattern 85a are electrically connected to one another by the first transparent conductive film 89.

In the test pad according to the second embodiment of the present invention, the shorting bars are formed according to the respective R, G, and B pixels. Then, the test pads are formed in a predetermined portion of the pad region to apply the signal voltage for on/off testing to the respective shorting bars. Therefore, the resistance value of the shorting bar can be reduced.

As mentioned above, the test pad for applying the signal voltage is formed in the predetermined portion of the shorting bar of the data side during on/off testing conducted after attaching the lower and upper substrates, so that the resistance value of the shorting bar can be reduced. Accordingly, it is possible to obtain reliability according to the test.

In view of the fact that the area of the test pad becomes smaller as the resolution becomes higher, it is not required that the width of the shorting bar be widened.

It will be apparent to those skilled in the art that various modifications and variations can be made in the LCD device of the present invention without departing from the spirit or scope of the invention. Thus, it is intended that the present invention cover the modifications and variations of this invention provided they come within the scope of the appended claims and their equivalents.

What is claimed is:

1. An LCD device comprising:
    a plurality of data pads;
    an LCD panel defined by a plurality of pad regions;
    a first shorting bar connected to data pads that drive a first color;
    a second shorting bar connected to data pads that drive a second color;
    a third shorting bar connected to data pads that drive a third color; and
    a test pad formed in a predetermined portion of a pad region among the plurality of pad regions to apply a signal voltage for on/off testing to the first shorting bar and the second shorting bar.

2. The LCD device as claimed in claim 1, wherein the test pad includes:
    a first conductive pattern connected to the first shorting bar;
    a second conductive pattern connected to the second shorting bar;
    a third conductive pattern connected to the third shorting bar; and
    a transparent conductive film electrically connecting the first shorting bar, the second shorting bar, and the third shorting bar to one another.

3. The LCD device as claimed in claim 2, wherein first conductive pattern and the second conductive pattern are disposed with a gate insulating film interposed therebetween.

4. The LCD device as claimed in claim 2, wherein first conductive pattern and the third conductive pattern are disposed with a gate insulating film interposed therebetween.

5. The LCD device as claimed in claim 2, further comprising a passivation film formed on an entire surface of a substrate including the third conductive pattern, the passivation film including a contact hole that exposes predetermined portions of the first conductive pattern, the second conductive pattern, and the third conductive pattern.

6. The LCD device as claimed in claim 2, wherein the third conductive pattern is electrically connected to the third shorting bar by the transparent conductive film penetrating a passivation film and a gate insulating film.

7. The LCD device as claimed in claim 1, wherein the first shorting bar and the second shorting bar are disposed with a gate insulating film interposed therebetween.

8. The LCD device as claimed in claim 1, wherein the second shorting bar and the third shorting bar are disposed with a gate insulating film interposed therebetween.

9. An LCD device comprising:
    a plurality of data pads;
    an LCD panel defined by a plurality of pad regions;
    a plurality of shorting bars connected to data pads; and
    a test pad formed in a predetermined portion of a pad region among the plurality of pad regions to apply a signal voltage for on/off testing to the shorting bars.

10. The LCD device according to claim 9, wherein the shorting bars are at least 3.

* * * * *